United States Patent [19]
Eng

[11] Patent Number: 5,964,557
[45] Date of Patent: Oct. 12, 1999

[54] TIMBER BANK WITH UPPER CONNECTION MECHANISM

[75] Inventor: Per-Gunnar Eng, Ramsjö, Sweden

[73] Assignee: ExTe Fabriks AB, Farila, Sweden

[21] Appl. No.: 09/051,035

[22] PCT Filed: Oct. 28, 1996

[86] PCT No.: PCT/SE96/01379

§ 371 Date: Mar. 31, 1998

§ 102(e) Date: Mar. 31, 1998

[87] PCT Pub. No.: WO97/15470

PCT Pub. Date: May 1, 1997

[30] Foreign Application Priority Data

Oct. 26, 1995 [SE] Sweden .................................. 9503780

[51] Int. Cl.[6] .................................................. B60P 7/12
[52] U.S. Cl. .............................. 410/37; 410/32; 410/34; 410/36; 280/146
[58] Field of Search ................................. 410/32, 34, 36, 410/37, 42; 280/404, 146; 296/43, 26.04, 26.05; 105/389

[56] References Cited

U.S. PATENT DOCUMENTS

| | | | |
|---|---|---|---|
| 858,834 | 7/1907 | Stas | 105/389 X |
| 870,123 | 11/1907 | Perry | 105/389 X |
| 893,165 | 7/1908 | Haley et al. | 105/389 X |
| 1,221,405 | 4/1917 | Alinder | 410/37 X |
| 1,342,654 | 6/1920 | Torgerson | 410/37 |
| 2,754,769 | 7/1956 | Yorston et al. | 105/389 X |
| 3,637,235 | 1/1972 | Karlin et al. | 410/37 |
| 4,375,893 | 3/1983 | Curtis | 280/146 |
| 4,668,000 | 5/1987 | Jokela | 410/37 X |
| 5,567,096 | 10/1996 | Howard | 410/42 |

FOREIGN PATENT DOCUMENTS

| | | | |
|---|---|---|---|
| 84243 | 7/1991 | Finland . | |
| 417182 | 3/1981 | Sweden . | |
| 420699 | 10/1981 | Sweden . | |
| 426677 | 2/1983 | Sweden . | |
| 1186539 | 10/1985 | U.S.S.R. | 410/42 |
| 1576379 | 7/1990 | U.S.S.R. | 410/42 |

*Primary Examiner*—Stephen T. Gordon
*Attorney, Agent, or Firm*—Melvin I. Stoltz

[57] ABSTRACT

A vehicle timber bank arrangement having a horizontal supporting beam and generally vertical post assemblies mounted at respective ends of the beam. Each post assembly includes a bottom post anchored firmly to the beam, and at least one top post which is displaceable telescopically to its associated bottom post. A pivotal upper connection member is pivotally mounted at at least the first top post, and at the second top post there is mounted a device for coupling with the upper connection member when this device is in a position in which it connects or binds the two to posts. The upper connection member is swung by a piston-cylinder device which functions to displace the first top post telescopically in relation to the first bottom post. The first top post and the part of the piston-cylinder device which actuates the first top post are coupled together by a rack-and-pinion arrangement.

19 Claims, 6 Drawing Sheets

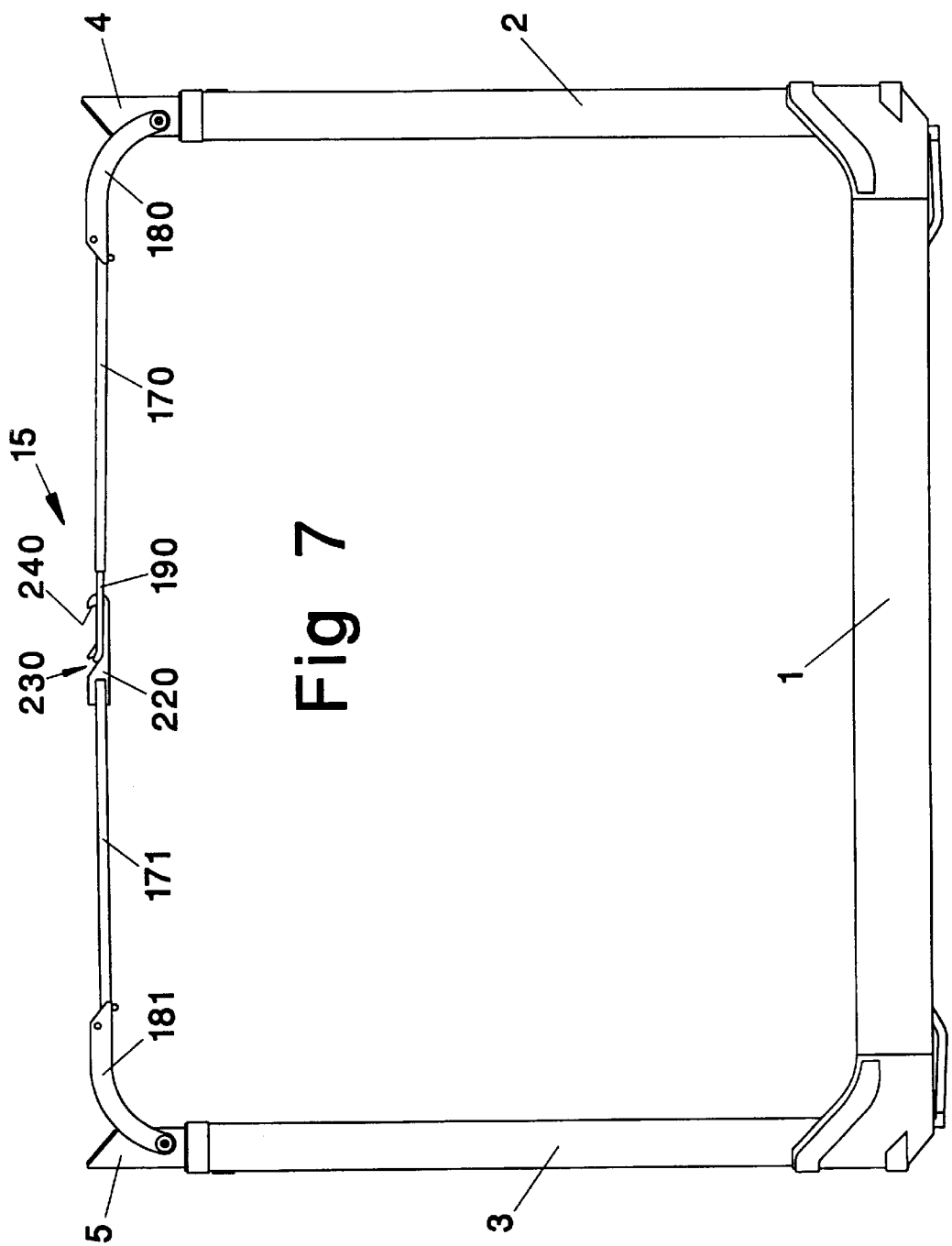

TIMBER BANK WITH UPPER CONNECTION MECHANISM

DESCRIPTION

1. Field of Invention

The present invention relates to a vehicle mounted timber bank comprising a horizontal load supporting beam and essentially vertical post assemblies mounted at each end of the beam, wherein each post assembly includes a bottom post anchored to the beam and at least one upper post which is displaceable telescopically in relation to the bottom post, wherein a pivotal upper connection means is pivotally mounted the first upper post, and wherein the upper post carries a coupling device for coupling with the upper connection means when said means is positioned so as to couple the two posts together.

2. Description of the Background Art

Arrangements of this kind are known to the art; see for instance 420 699 and SE 426 677. They are used to compress small-diameter tees, branches and like material, so as to enable a large quantity of material to be transported on vehicles by road. They can also be used to secure timber and therewith replace conventional bundle straps and the like. One drawback with bundles straps is that the belts or chains of such devices must be thrown over the load, with the subsequent risk of injury to persons in the near vicinity. This drawback is avoided with the arrangement taught by the aforesaid patent specifications.

However, the arrangements taught by these prior publications do not function satisfactorily, mainly because of their complicated construction and/or because of their poor reliability in operation.

SUMMARY OF THE INVENTION

The object of the present invention is to eliminate at least partially the drawbacks of earlier known arrangements of the kind defined in the introduction, and to provide an arrangement of simple construction and high operational reliability. The arrangement can be used both to compress loaded material and to firmly restrain the material.

This object is achieved with an inventive arrangement having the features set forth in the characterizing clauses of respective claims.

BRIEF DESCRIPTION OF THE DRAWINGS

FIG. 7 is a schematic end view of a further embodiment of a vehicle timber bank that includes the inventive arrangement, said arrangement being shown in a first mode corresponding to FIG. 1.

DESCRIPTION OF PREFERRED EMBODIMENTS

Figure 1:
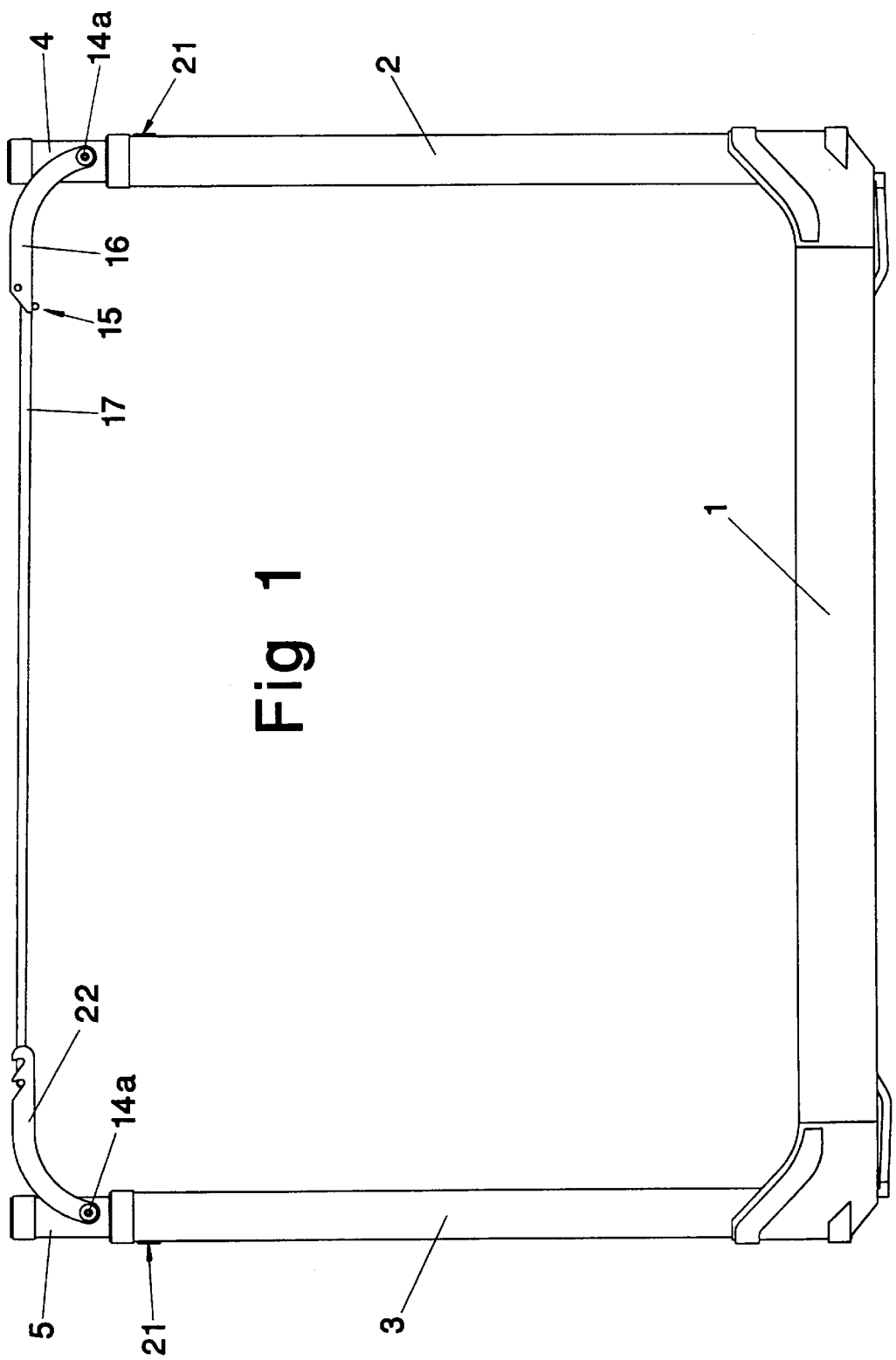
FIG. 1 is a schematic end view of a vehicle timber bank which includes the inventive arrangement, said arrangement being shown in a first mode.
Figure 2:
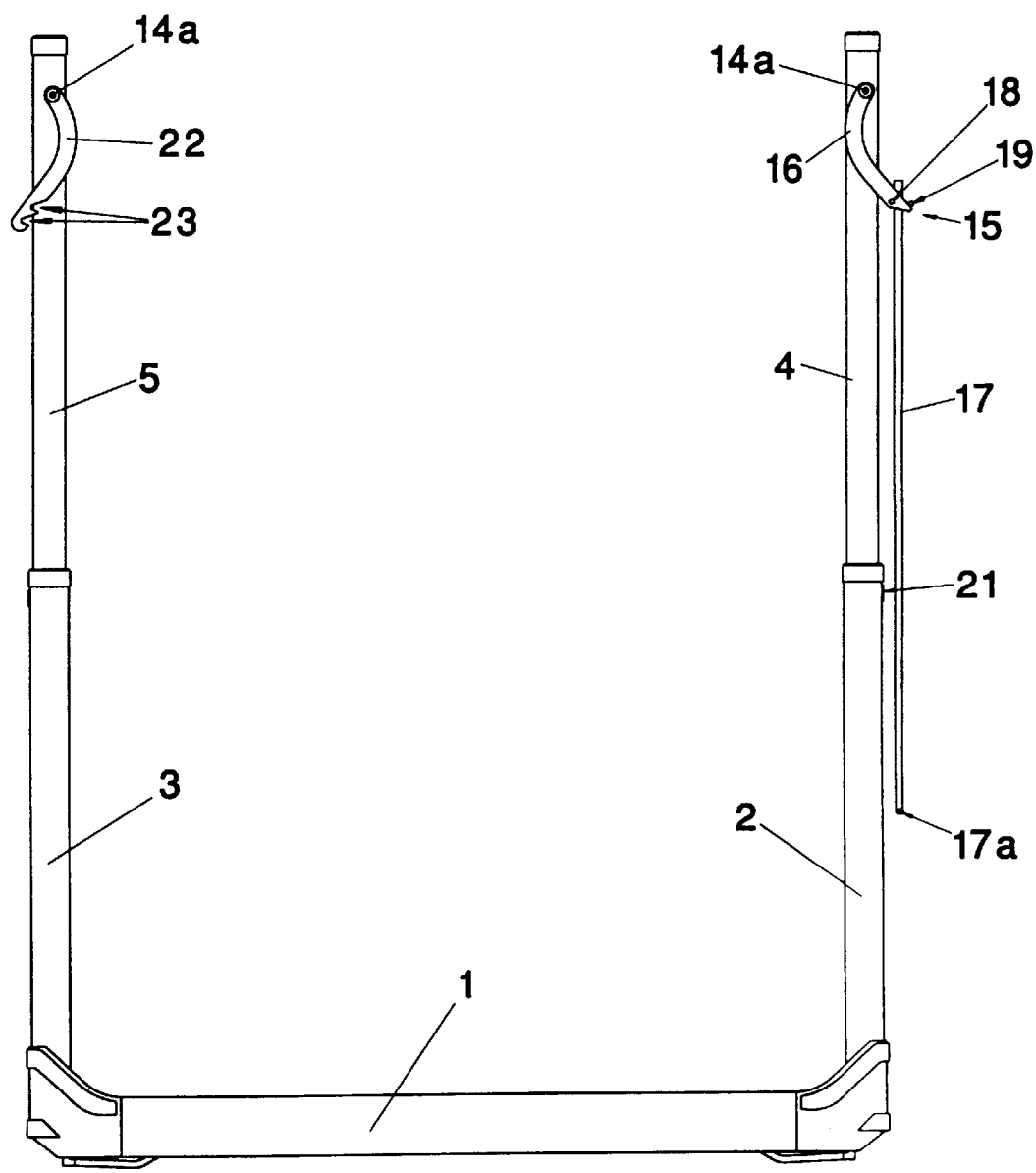
FIG. 2 is a schematic end view similar to that of FIG. 1, but shows the arrangement in a second mode which enables the vehicle to be loaded or unloaded.

FIGS. 1 and 2 illustrate a timber bank which is intended to be mounted on goods vehicle such as to extend transversely to the long axis of the vehicle. The vehicle carries a plurality of such timber banks in space relationship in the longitudinal direction of the vehicle. The timber bank includes a horizontal beam 1, which is attached to the chassis of the vehicle, and to post assemblies each of which comprises a respective bottom post 2 and 3, and a respective top post 4 and 5, said post assemblies extending vertically upwards from respective ends of the beam 1. Additional posts may be arranged telescopically between the top and bottom posts.

The respective bottom posts 2 and 3 and top posts 4 and 5 are of generally square cross-section and are generally identical with one another, although in mirror image. The bottom ends of the bottom posts 2 and 3 are anchored to the beam 1 in a conventional manner.

The top posts 4 and 5 can be moved telescopically within the bottom posts 2 and 3, with the aid of mutually identical piston-cylinder devices. Each piston-cylinder device includes a cylinder whose bottom end is attached to respective bottom ends of the bottom posts 2 and 3, and a piston rod 7 whose upper end carries an enlargement 8 on which a gear rack 9 is mounted. A plate 11 is secured to the rack 9 by means of a screw joint 10. Detachably clamped between the plate 11 and the enlargement 8 is a slide rail 12 whose one side is in abutment with the rack 9 and whose other side is intended to slide against the top post 4. The upper end of the top post 4 is closed by a cover member 13. A gear wheel or pinion 14 is rotatably mounted within the top post 4 on a shaft 14a and engages with the rack 9. The shaft 14a of the pinion wheel 14 is connected to identical pivot arms 16 of an upper connection means 15, on opposite sides of the post assembly. The upper connection means 15 also comprises a rail or bar 17 which can be pivoted on the mutually connected arms 16 at 18. The left end of the rail 17 is provided with a rod 17a. The arm 16 includes a stop shoulder 19 which prevents the rail 17 from rotating anticlockwise on the arm 16 to a greater extent than that shown in FIG. 4.

Figure 3:
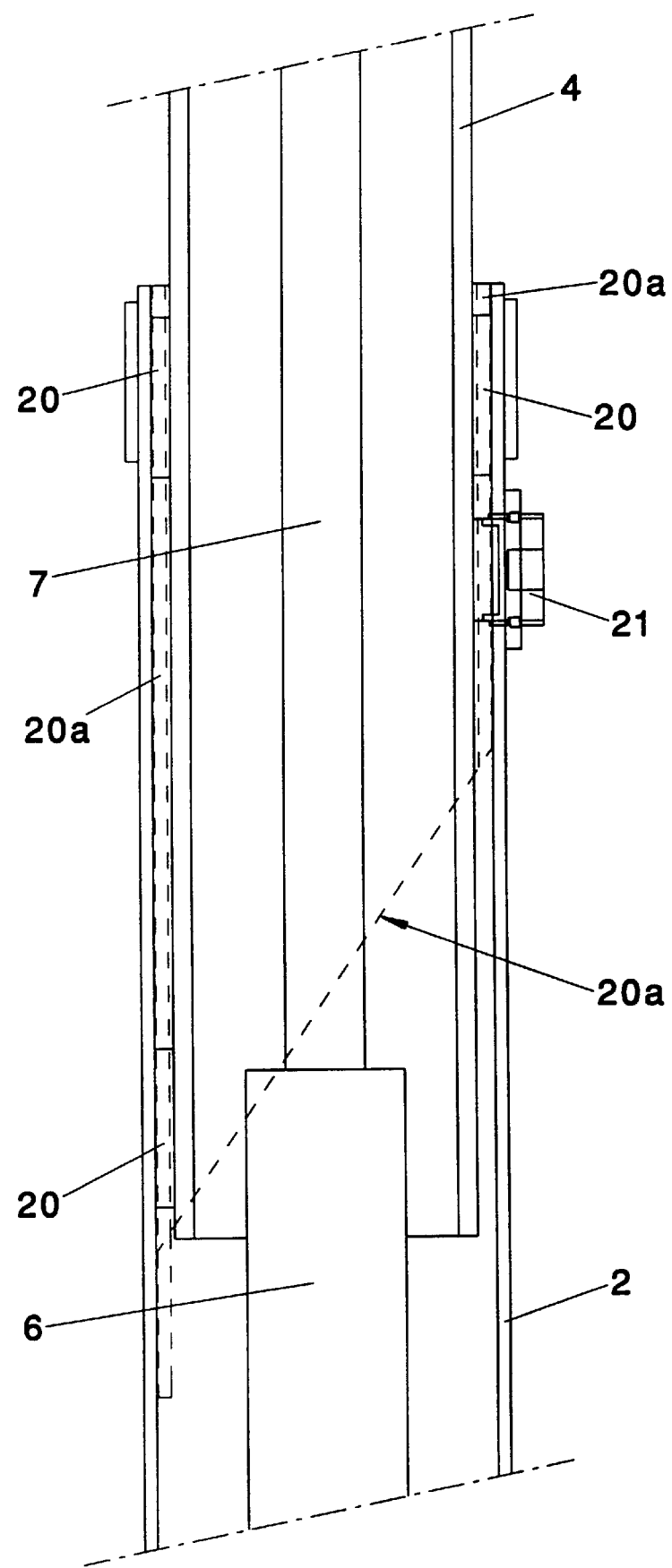
FIGS. 3, 4 and 5 are end views, partially in section, of parts of the arrangement shown in FIGS. 1 and 2.

As will be seen from FIG. 3, the arrangement also includes slide shoulders 20 disposed on the inside of the bottom posts 2, 3 in a detachable holder 20a, said slide shoulders functioning to reduce wear and to facilitate movement of the top posts 4, 5 within the bottom posts. The holder 20a is comprised of a sleeve of square cross-section and includes a bevelled bottom part and a rectangular recess on two mutually opposing sides. The shoulders 20 may be made of a highly durable plastic material that exhibits low sliding resistance and are detachably inserted into said recesses. Also shown in FIG. 3 is a brake means 21 which can be actuated manually to adjust the friction between the top and bottom posts. The brake means 21 is suitably comprised of a screw provided with a friction coating.

Figure 4:
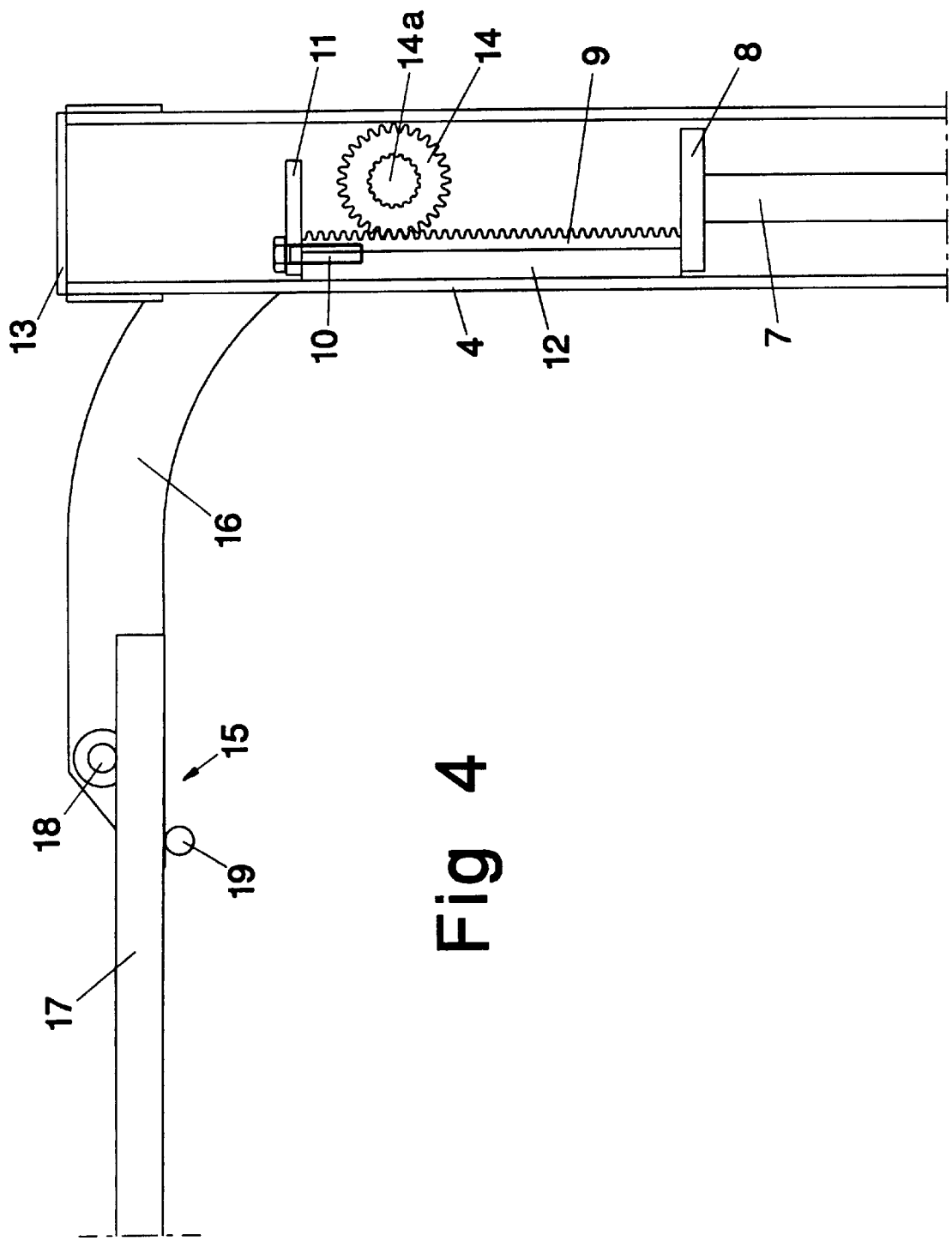
Figure 5:
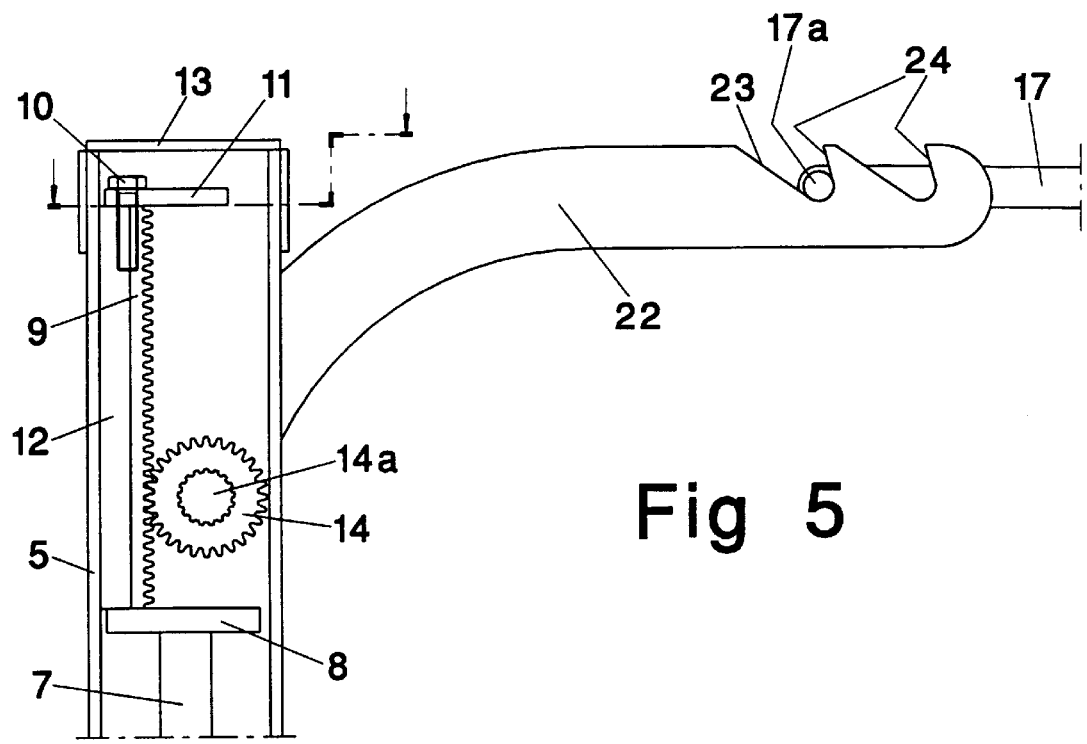
Figure 6:
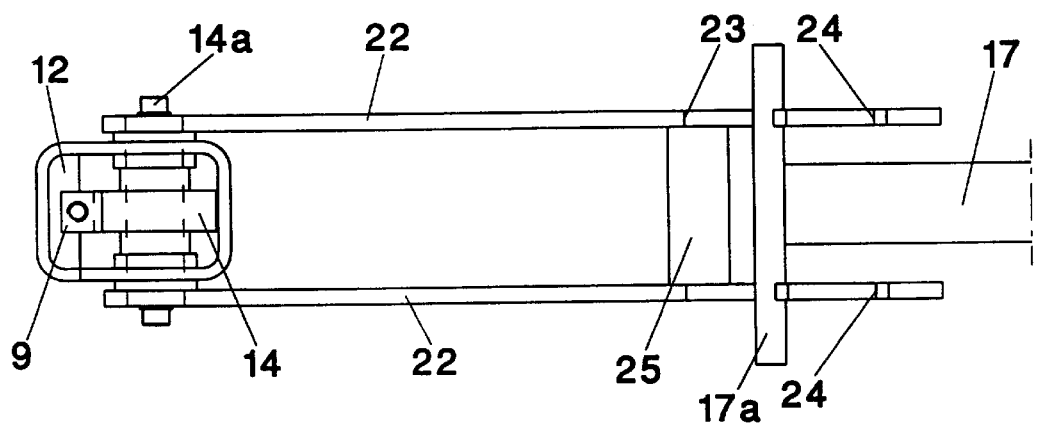
FIG. 6 is a part sectional view from above of one part of the arrangement shown in FIGS. 1 and 2.

FIGS. 5 and 6 illustrate coupling means that includes two mutually identical capture arms which are connected by a shaft 25 and the ends of which are rigidly connected to a shaft and a pinion wheel identical to the shaft 14a and the pinion wheel 14 shown in FIG. 4. The pinion wheel 14 and thus the arms 22 are actuated by means 6–12, 14 identical with those used to actuate the arms 16. Each arm 22 is provided with two identical recesses 23 whose right flanks 24 in FIG. 5 slope upwards and to the left in said Figure when the arms are in the positions shown in FIG. 5.

FIG. 7 illustrates a further embodiment that lies within the scope of the present invention and which finds correspondence in the earlier described embodiment but with the difference that the upper connection means 15 is divided into a first connection part 170 and a second connection part 171, wherein the first connection part 170 is pivotally attached to a first pivot arm 180 in a manner similar to that described above, and wherein the second connection part 171 is pivotally attached to a second pivot arm 181. The two parts 170, 171 of the upper connection means are intended to be hooked together centrally of the two post assemblies 2, 3, 4, 5 midway over the beam 1 with a similar hooking action to that described and illustrated. In this regard, the first connection part 170 is provided with an attachment loop 190 which is intended to be hooked firmly in a coupling device 220 that includes at least one recess 230 having upwardly sloping flank surfaces 240 in accordance with the aforedescribed. The embodiment illustrated in FIG. 7 also includes top posts 4, 5 whose upper ends slope inwards.

The manner in which the inventive arrangement works will now be described.

When the vehicle is loaded or empty, the two post assembly 2, 4, and 3, 5 will be mutually connected by means of the upper connection means 15. In this mode of the arrangement, the rack 9 in the upper post 4 will be in the intermediate position shown in FIG. 4, whereas the rack 9 in the upper post 5 will be in the position shown in FIG. 5. When activating the hydraulic system in which the two piston-cylinder devices 6, 7 are included and which is maneuvered from the vehicle driving cabin, the piston rod 7 in the left posts 3, 5 will move upwards. This upward movement causes the pinion wheel 14 to be rotated clockwise in FIG. 5 by the rack 9, wherewith the arms 22 are swung clockwise so that the edges 24 the recessed portion 23 in which the rod 17a is held will extend vertically or slope upwardly to the right in FIG. 5. The screw joint 10 strikes against the cover member 13 at the end of the pivoting movement.

The piston rod 7 is then moved upwards in the right posts 2, 4 from the position shown in FIG. 4 therewith causing the rack 9 to rotate the pinion wheel 14 clockwise. The upper connection means 15 is therewith swung clockwise to the position shown in FIG. 2. Because the upper connection means 15 is divided, the rail 17 will hang vertically along the post assemblies 2, 4. The upper part of the joint 10 will be in abutment with the cover member 13 at the end of the pivoting movement.

The piston-cylinder devices 6, 7 in the two post assemblies are then actuated so that the piston rods move the top posts 4, 5 to their uppermost positions, shown in FIG. 2, through the medium of the gear racks 9, the joints 10 and the cover members 13.

The piston-cylinder device 6, 7 in the left post assembly 3, 5 is then actuated so that the gear rack 9 will rotate the pinion wheel 14 anticlockwise, wherewith the capture arms 22 are swung to their generally vertical, downwardly facing positions shown in FIG. 2.

Loading is commenced in this latter FIG. 2 shown position. When loading is complete, the piston-cylinder device 6, 7 in the left post assembly 3, 5 is actuated so that the capture arms 22 will be rotated clockwise by the rack-and-pinion arrangement 9, 14 to a position which is slightly further than the position shown in FIG. 5 in a clockwise sense.

The piston-cylinder device 6, 7 in the right post assembly 2, 4, 5 is then actuated so as to swing the upper connection means 15 anticlockwise from the position shown in FIG. 2. The rail 17 is not entrained by this swinging movement until the stop shoulder 19 has come into engagement with the rail. When the rail 17 has passed its vertical position, it falls anticlockwise in across the load until stopped by the stop shoulder 19.

Subsequent to the rod 17a engaging the capture arms 22 and being received in one of the recesses 23, the piston-cylinder devices in both post assemblies are actuated so that said post assemblies and the upper connection means 15 will be lowered. At the end of this movement, the capture arms 22 are swung slightly in an anticlockwise direction as a result of pressing against the upper side of the load. This ensures that the rod 17a will not release its engagement with the recess 23. The load is now firmly clamped and a cabin mounted pressure monitor will indicate when it is necessary to subsequently further clamp the load during its transportation. If this becomes necessary, the piston-cylinder devices 6, 7 are actuated so as to cause the upper connection means 15 to be moved to a lower position.

When unloading the vehicle, the capture arms 22 are slightly swung in a clockwise direction away from the position shown in FIGS. 1 and 5, in the aforedescribed manner, so as to enable the upper connection means 15 to be swung clockwise out of engagement with the recesses 23 in the capture arms to the position shown in FIG. 2. The capture arms are also swung to this position.

When unloading of the vehicle is completed and the vehicle is to be driven while empty, the capture arms 22 are swung clockwise to a slightly longer extent than that shown in FIG. 5. The upper connection means 15 is then swung anticlockwise until its rod 17a comes into abutment with one of the recesses 23, whereafter the upper posts 4, 5 are lowered until the arrangement is in the mode shown in FIG. 1.

The embodiment illustrated in FIG. 7 functions in the same manner as that described above with the exception that coupling is effected above the beam 1 instead.

It will be understood that the invention is not restricted to the aforedescribed and illustrated embodiments thereof and that the invention is restricted solely by the scope of the following claims.

I claim:

1. A vehicle timber bank arrangement comprising a horizontal load supporting beam (1) and first and second generally vertical post assemblies (2, 4 and 3, 5) attached at respective ends of said beam, wherein each of the post assemblies includes a respective first and second bottom post (2, 3) anchored to said beam, and at least one top post (4, 5) which is telescopically displaceable relative to a respective said bottom post, wherein a pivotal upper connection means (15) is pivotally mounted at the first post assembly top post (4), wherein a device for coupling with the upper connection means is mounted at the second post assembly top post (5) when said upper connection means is in a position in which it connects said top posts, and wherein the upper connection means is swung by a piston-cylinder device (6, 7) which functions to displace the first post assembly top post telescopically in relation to the first bottom post, characterized in that the first post assembly top post (4) and that part (7) of the piston-cylinder device (6, 7) which actuates said first post assembly top post are coupled together with the aid of a rack-and-pinion arrangement (9–12, 14).

2. The arrangement defined in claim 1, wherein the coupling device (22) is pivotally journalled on the second post assembly top post (5) by means of a second piston-cylinder device (6, 7) which functions to displace the second post assembly top post telescopically in relation to the second bottom post; and in that the second post assembly top post and that part (7) of the second piston-cylinder device which actuates said second post assembly top post are coupled with the aid of a second rack-and-pinion arrangement (9–12, 14).

3. The arrangement defined in claim 1, wherein the rack-and-pinion arrangement (9–12, 14) includes at least one gear rack (9) mounted on said part (7) of the piston-cylinder device (6, 7) and engaging with at least one pinion wheel (14) rotatably connected to at least the upper connection means (15).

4. The arrangement defined in claim 3, wherein a slide element (12) is mounted between the gear rack (9) and the inner surface of the at least the first post assembly top post.

5. The arrangement defined in claim 1, wherein said coupling device is pivotally movable by a second piston-cylinder device (6, 7) which functions to displace the second post assembly top post (5) telescopically in relation to the second bottom post (3).

6. The arrangement defined in claim 1, wherein a brake means (21) is mounted between the top posts (4, 5) and the respective bottom post (2, 3) and functions to prevent relative displacement of said top and bottom posts until pivotal movements of the upper connection means (15) and the coupling device (22) have been terminated.

7. The arrangement defined in claim 1, wherein the upper connection means (15) includes a first part (16) which is pivotally connected to the first post assembly top post (4) and also connected pivotally to a second part (17) which engages the coupling device (22) and which is longer than said first part.

8. The arrangement defined in claim 1, wherein the coupling device (22) includes at least one recess (23) which prevents the upper connection means (15) from swinging away from and out of engagement with the coupling device when said coupling device is in a first position and permits the upper connection means to swing away from and out of engagement with said coupling device when said coupling device is in a second position.

9. The arrangement defined in claim 1, wherein a sleeve (20a) provided with a side element (20) is mounted between respective ones of said bottom posts (2 and 3) and respective ones of said top posts (4 and 5).

10. The arrangement defined in claim 1, wherein the upper connection means (15) includes a first upper connection part (170) which is mounted for pivotal movement at the first post assembly top post (4), and a second upper connection part (171) which is pivotally mounted at the second post assembly top post (5) and which carries said device (220) for coupling the first connection part (170) when the upper connection means (15) is in a position in which it binds the top posts.

11. The arrangement defined in claim 10, wherein the coupling device (220) is fixedly mounted on the second upper connection part (171) which, in turn, is pivotally mounted on the second post assembly top post (5) by means of a second piston-cylinder device (6, 7) which functions to displace the second post assembly top post telescopically in relation to the second bottom post; and in that the second post assembly top post and that part (7) of the second piston-cylinder device which actuates said second post assembly top post are mutually coupled with the aid of a second rack-and-pinion arrangement (9–12, 14).

12. The arrangement defined in claim 10, wherein the rack-and-pinion arrangement (9–12, 14) includes at least one gear rack (9) mounted on said part (7) of the piston-cylinder device (6, 7) and engaging with at least one pinion (14) that is rotatably connected to at least the upper connection means (15).

13. The arrangement defined in claim 12, wherein a slide element (12) is mounted between the rack (9) and the inner surface of at least the first post assembly top post.

14. The arrangement defined in claim 10, wherein the coupling device (220) is swung by a second piston-cylinder device (6, 7) which functions to displace the second post assembly top post (5) telescopically in relation to the second bottom post (3).

15. The arrangement defined in claim 10, wherein brake means (21) are mounted between the top posts (4, 5) and the respective bottom posts (2, 3), said brake means functioning to prevent relative displacement of the top and bottom posts until pivotal movement of the upper connection means (15) and the coupling device (220) has terminated.

16. The arrangement defined in claim 10, wherein the upper connection means (15) includes a first part (180) which is pivotally connected to the first post assembly top posts and also pivotally connected to the first upper connection part (170) which engages the coupling device (220).

17. The arrangement defined in claim 10, wherein the upper connection means (15) includes a second part (181) which is pivotally connected at the second post assembly top post (5) and which is also pivotally connected to the second upper connection part (171) connected to the coupling device (220).

18. The arrangement defined in claim 10, wherein the coupling device (220) includes at least one recess (230) which functions to prevent the upper connection means (15) from swinging away from and out of engagement with the coupling device when said coupling device is in a first position and permits the upper connection means to swing away from and out of engagement with the coupling device when said coupling device is in a second position.

19. The arrangement defined in claim 10, wherein a sleeve (20a) is provided with a slide element (20) and mounted between respective ones of said bottom posts (2, 3) and ones of said top posts 4, 5).

\* \* \* \* \*